United States Patent [19]
Zider

[11] Patent Number: 6,139,141
[45] Date of Patent: Oct. 31, 2000

[54] AUXILIARY EYEGLASSES WITH MAGNETIC CLIPS

[75] Inventor: Robert B. Zider, Portola Valley, Calif.

[73] Assignee: Altair Holding Company, Rancho Cordova, Calif.

[21] Appl. No.: 09/315,108

[22] Filed: May 20, 1999

Related U.S. Application Data

[60] Provisional application No. 60/086,355, May 20, 1998.

[51] Int. Cl.[7] ........................................... G02C 7/08
[52] U.S. Cl. ........................... 351/57; 351/47; 351/149
[58] Field of Search ....................... 351/47, 57, 140, 351/149

[56] References Cited

U.S. PATENT DOCUMENTS 5,929,964  7/1999  Chao ........................................... 351/47
5,936,700  8/1999  Masunaga ................................. 351/47

*Primary Examiner*—Huy Mai
*Attorney, Agent, or Firm*—R. Michael West; Boutin, Dentino, Gibson, Di Giusto, Hodell & West

[57] ABSTRACT

A magnetic mounting arrangement for removably attaching auxiliary eyeglasses to an eyeglass frame. The mounting arrangement includes a male part having a projection thereon and a female part having a recess therein. The male and female parts are permanently attached to the auxiliary eyeglasses and the eyeglass frame such that the projection engages the recess when the auxiliary eyeglasses are attached to the eyeglass frame. The male and female parts can be of a magnetic or magnetizable material. The male part can include a stepped surface which mates with a stepped surface of the female part when the projection is fitted within the recess. The auxiliary eyeglasses can be various types of lenses such as sunglasses, computer glasses, fish tying readers, or magnifying glasses.

17 Claims, 3 Drawing Sheets

AUXILIARY EYEGLASSES WITH MAGNETIC CLIPS

This application claims the benefit of U.S. Provisional Application No. 60/086,355, filed May 20, 1998.

FIELD OF INVENTION

This invention relates to eyeglasses with auxiliary eyeglasses (such as sunglasses) which are detachably secured.

DESCRIPTION OF THE PRIOR ART

There is much prior art in the field of ornamental covers for eyeglass frames. Early endeavors such as those described in U.S. Pat. No. 4,070,103 described spectacles which cannot be worn by themselves without decorative covers since hinges, prongs, wires or magnetic tape have been secured to them or holes or other fastening means drilled into or through them to facilitate applying of the decorative front piece or rim covers (column 1, lines 18–25). Magnets have further been discussed in the prior art and are known to use an embedded magnet or magnets in the frontal portion of the lens rim for attaching the decorative front piece which also has a magnet or magnets of an opposite pole. The magnets are heavy and unsightly when the front piece is not in place (column 1, lines 58–64). The object of the '103 patent is to provide continuous rim walls and allow single or multiple piece attachments to be applied mechanically, with friction tape, or with magnets. In doing so, it was also presumed that one could change the shape of the lenses with the overlay. Another prior art disclosure is in U.S. Pat. No. 5,181,051. In this disclosure, magnetic material is used to enable multiple decorations to be put on metal frames. A series of grooves are provided as well as magnetic materials to facilitate the attachment of the display. A further embodiment of magnetic attachments is in U.S. Pat. No. 5,416,537. The clips are stated to be unattractive and the bonding method which had been used before is characterized as leaving room for improvement (column 1, line 25–26). They are also concerned about sunlight gaps which need to be minimized. In this patent, magnets are attached at the "temporal positions" which correspond to the frames. The magnets are positioned on the surface or possibly slightly under the surface to maintain the magnetic attraction, while minimizing any detraction to the appearance.

Finally, U.S. Pat. No. 5,568,207 draws attention to the structural problems of prior art patents. In addition to providing a hidden attachment, this patent also attempts to provide structural support to prevent the auxiliary eyeglasses from sliding downwards. It accomplishes that by providing a resting place behind the eyepiece which is not readily visible and providing a mating arm attached to the auxiliary eyeglasses which reaches over and attaches behind the eye piece. This results in a stacked formation where the auxiliary lens eye piece rests on top of the arms of the eye piece of the primary frame. When the auxiliary eyeglasses are not in use, the eyeglass frame appears quite similar to a non-magnetic frame.

While the prior art has clearly made mention of using magnets as a method to secure auxiliary eyeglasses, such as sunglasses, it has ineffectively dealt with the tradeoffs of convenience, attractiveness, and structural requirements. It would be desirable to improve upon the prior art by combining the convenience of simple attachment, with stronger mating systems which employ both magnets and structural design to improve the holding power of the auxiliary eyeglasses onto the primary frame. Further, while prior art frames have utilized magnets in the form of simple flat mating pieces, it would be desirable if the magnets mated in a way such that they provided both downward integrity and prevented side-to-side slippage whereby the auxiliary eyeglasses could be maintained in the proper position when attached.

SUMMARY OF THE INVENTION

The invention overcomes drawbacks of the prior art by providing a magnetic mounting arrangement for removably attaching auxiliary eyeglasses to an eyeglass frame. The mounting arrangement includes a male part having a projection thereon and a female part having a recess therein, the male and female parts being attached to the auxiliary eyeglasses and the eyeglass frame such that the auxiliary eyeglasses are removably attached to the eyeglass frame by engaging the projection of the male part in the recess of the female part.

The mounting arrangement can be implemented in various ways. For instance, the male part can be attached to an extension on the eyeglass frame or an extension on the auxiliary eyeglasses. The male part can include a flat surface adjacent the projection and the female part can include a flat surface adjacent the recess, the flat surface of the male part abutting the flat surface of the female part when the auxiliary eyeglasses are attached to the eyeglass frame by the magnetic mounting arrangement. The magnetic mounting arrangement preferably prevents lateral movement of the auxiliary eyeglasses with respect to the eyeglass frame. As an example, the magnetic mounting arrangement can include a first pair of the male and female parts and a second pair of the male and female parts, the first pair of male and female parts being attached to left-side extensions of the eyeglass frame and auxiliary eyeglasses and the second pair of male and female parts being attached to right-side extensions of the eyeglass frame and auxiliary eyeglasses.

The male and female parts can be attached to various parts of the eyeglass frame and auxiliary eyeglasses such as to a nose bridge of the eyeglass frame and a bridge of the auxiliary eyeglasses. The male part can include a stepped surface and the female part can include a stepped surface, the stepped surfaces of the male and female parts being in contact when the auxiliary eyeglasses are attached to the eyeglass frame by the magnetic mounting arrangement. The male and female parts can be permanent magnets or either the male part or the female part can be of a magnetizable material. The auxiliary eyeglasses can include a bridge of elastic material such as beta-titanium or shape memory alloy which is elastically deformed and exerts a force on the male and female parts when the auxiliary eyeglasses are attached to the eyeglass frame.

The male and female parts are preferably not visible when the auxiliary eyeglasses are attached to the eyeglass frame. The auxiliary lenses can be sunglasses or other type of eyeglasses. The male part can include a magnet forming part of the projection and a non-magnetic material forming at least part of the male part. The female part can include a magnet defining part of the recess and a non-magnetic material forming at least part of the female part. The projection can comprise a magnet and the female part can comprise a magnetizable material such as iron or steel. The projection can comprise a cylindrical rod and the recess can comprise a cylindrical bore. For example, the projection can comprise a cylindrical magnet and the recess can comprise a cylindrical bore in a magnet or magnetizable material. The female part can also include a magnetizable steel defining at least part of the recess and/or the male part can include a magnet defining at least part of the projection.

DETAILED DESCRIPTION OF THE PREFERRED EMBODIMENTS OF THE INVENTION

Figure 1:
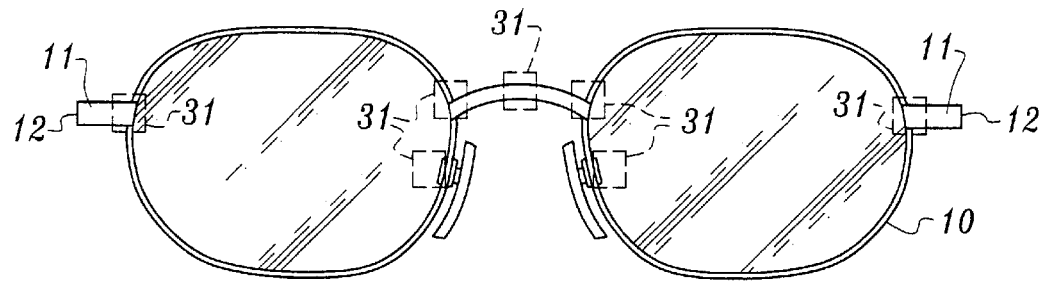
FIG. 1 shows an eyeglass frame incorporating the magnetic clip attachments according to the invention.
Figure 2:
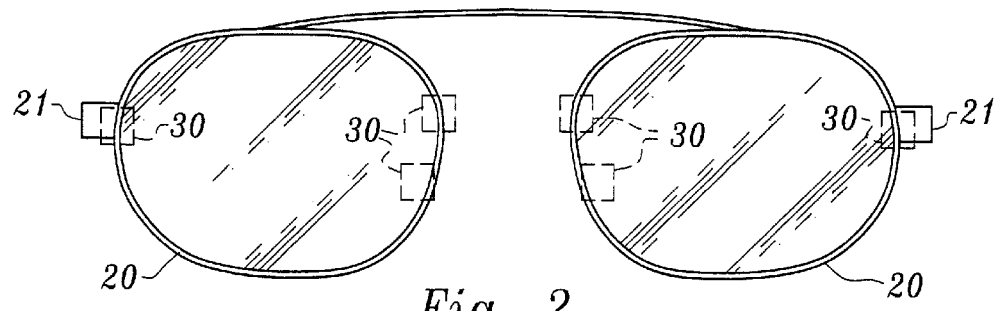
FIG. 2 shows a first embodiment of auxiliary eyeglasses incorporating the magnetic clip attachments according to the invention.
Figure 3:
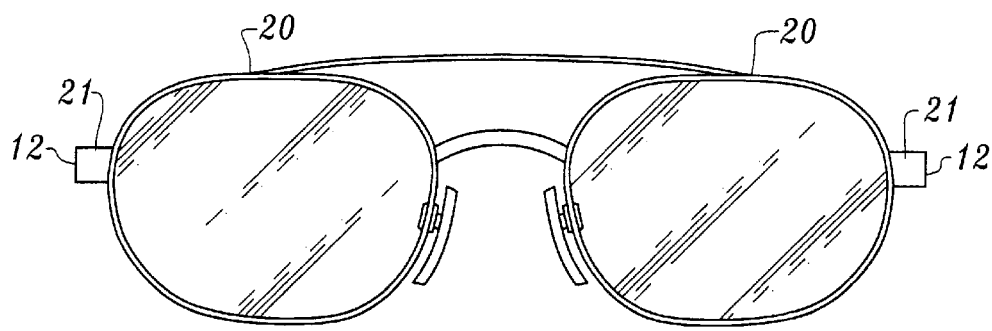
FIG. 3 shows the eyeglass frame of FIG. 1 attached to the auxiliary eyeglasses of FIG. 2 using the magnetic clip attachments according to the invention.

FIG. 1 shows an eyeglass frame 10 having extensions 11 at opposite sides thereof. The extensions include hinge connections for temple pieces 12, as shown in FIG. 3. FIG. 2 shows one embodiment of auxiliary eyeglasses 20 having extensions 21 at opposite sides thereof. The auxiliary eyeglasses 20 are removably attached to the eyeglass frame 10 by one or more magnetic clips 30 located at one or more connection points 31 on the eyeglass frame 10. For instance, in the case where the auxiliary eyeglasses 20 have magnetic clips located at the extensions 21, the eyeglass frame can include magnetic clips at the connection points 31 on the extensions 11. The magnetic clips preferably have mating shapes which provide proper alignment of the auxiliary eyeglasses with the eyeglass frame and/or prevent slippage of the auxiliary eyeglasses with respect to the eyeglass frame.

Figure 4:
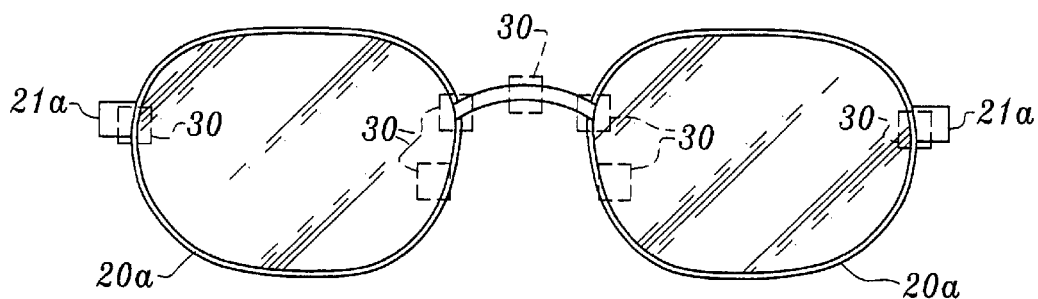
FIG. 4 shows a second embodiment of auxiliary eyeglasses incorporating the magnetic clip attachments according to the invention.

FIG. 4 shows another embodiment of auxiliary eyeglasses 20a having extensions 21a at opposite sides thereof. Like the auxiliary eyeglasses 20, the auxiliary lenses 20a are removably attached to the eyeglass frame 10 by one or more magnetic clips 30 located at one or more connection points 31 on the eyeglass frame 10. For instance, the magnetic clips can be located at the extensions 21a and the eyeglass frame can include magnetic clips at the connection points 31 on the extensions 11.

Figure 5:
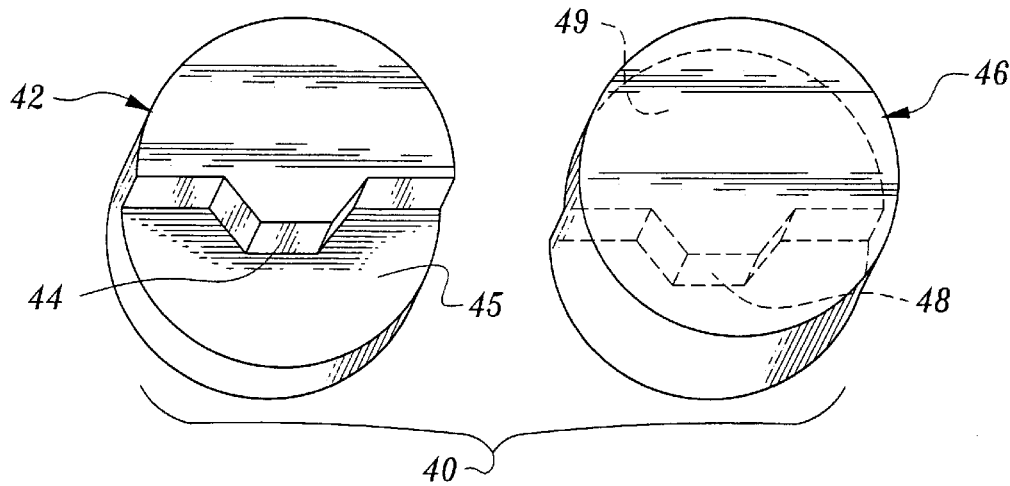
FIG. 5 shows a magnetic clip in accordance with one embodiment of the invention.
Figure 6:
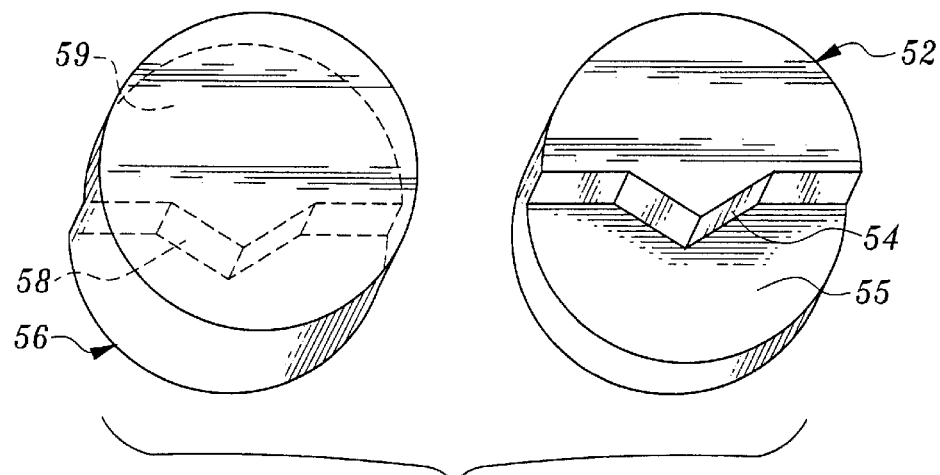
FIG. 6 shows a magnetic clip in accordance with another embodiment of the invention.

The magnetic clips can have various mating shapes. For example, FIG. 5 shows an embodiment of a magnetic clip 40 having a dovetail design and FIG. 6 shows an embodiment of a magnetic clip 50 having a V-shaped design. In either case, the magnetic clip includes first and second parts wherein the first part is mounted on the eyeglass frame and the second part is mounted on the auxiliary eyeglasses. For instance, as shown in FIG. 5, the clip 40 can include a first male part 42 having a projection 44 which is received in a similarly shaped recess 48 (shown in dotted lines) in a second female part 46. Similarly, as shown in FIG. 6, the clip 50 can include a first male part 52 having a projection 54 which is received in a similarly shaped recess 58 (shown in dotted lines) in a second female part 56. To provide additional magnetic holding power, the clips 40,50 include stop surfaces 45, 55 on the male parts 42,52 which abut corresponding surfaces on the female parts 46,56.

Figure 7:
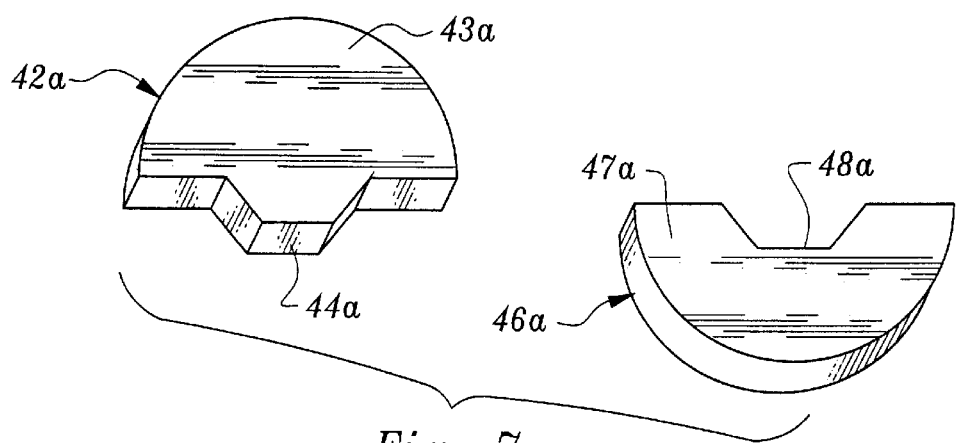
FIG. 7 shows a magnetic clip in accordance with a further embodiment of the invention.

Although the outer periphery of the clips 40,50 are shown as being round, the clips can have any desired peripheral shape such as square, rectangular, triangular, oblong, etc. Further, while the male and female parts are shown as having the same overall peripheral shapes, the male and female parts can be smaller in size, e.g., the stop surfaces 45,55 can be omitted. For example, as shown in FIG. 7, male part 42a can be semi-circular with a projection 44a extending outwardly from a flat outer surface 43a and female part 46a can be semi-circular with a recess 48a extending into a flat outer surface 47a. In use, the male part 42a engages female part 46a such the projection 44a fits into the recess 48a and the flat surfaces 43a and 47a are in contact with each other.

Figure 8:
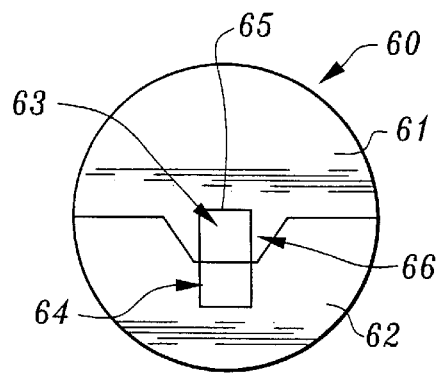
FIG. 8 shows a modification of the magnetic clip shown in FIG. 5 wherein magnets form part of the male and female parts.

FIG. 8 shows a modification to the embodiment shown in FIG. 5. In the FIG. 8 embodiment the magnetic clip 60 includes a male part 61 and a female part 62, and magnets 63,64. The magnets 63,64 can be embedded or adhesively attached to the male and female parts. For instance, the magnet 63 can be glued in a bore 65 of the projection 66 of the male part 61 such that the north pole of the magnet is exposed and facing the magnet 64. In a similar manner, the magnet 64 can be embedded or adhesively attached to a bore in the female part 62 such that the south pole of the magnet 64 faces the north pole of the magnet 63. The male and female parts other than the magnets can be of any suitable material such as a conductive, non-conductive or semi-conductive material including polymer, metal and/or ceramic materials.

Figure 9:
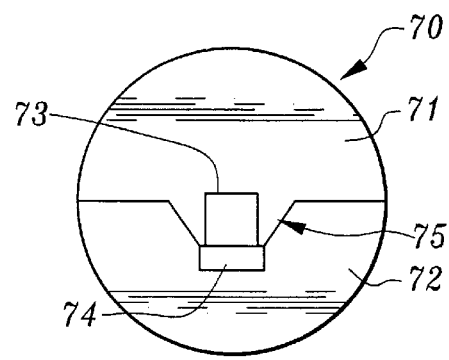
FIG. 9 shows a modification of the magnetic clip shown in FIG. 5 wherein a magnet and a magnetizable material form part of the male and female parts.

FIG. 9 shows a modification to the embodiment shown in FIG. 5. In the FIG. 9 embodiment the magnetic clip 70 includes a male part 71 and a female part 72, magnet 73 and magnetizable material 74. The magnet 73 can be embedded or adhesively attached to the male part. For instance, the magnet 73 can be glued in a bore of the projection 75 of the male part 71 such that a portion such as the north or south pole of the magnet is exposed and facing the magnetizable material 74. In a similar manner, the magnetizable material 74 can be embedded or adhesively attached to a bore in the female part 72 such that a portion of the magnetizable material 74 faces the magnet 73. The male and female parts other than the magnet and magnetizable material can be of any suitable material such as a conductive, non-conductive or semi-conductive material including polymer, metal and/or ceramic materials.

Figure 10:
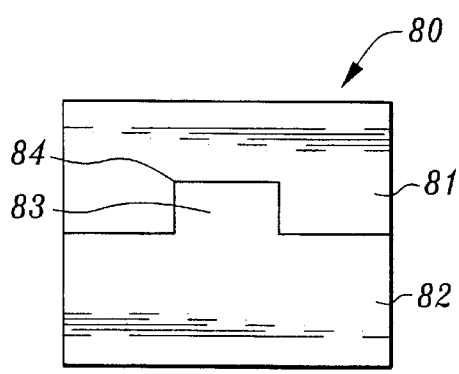
FIG. 10 shows a magnetic clip in accordance with an embodiment of the invention.

FIG. 10 shows a further embodiment of the magnetic clip in accordance with the invention. In the FIG. 10 embodiment the magnetic clip 80 includes a female part 81 and a male part 82, at least one of which is a magnet. The male part includes a projection 83 in the form of a cylindrical rod and the female part includes a cylindrical bore 84 in which the projection is received when the male part is attached to the female part. As an example, the male part 82 can be a magnet and the female part 81 can be of a magnetizable material such as iron or steel. Alternatively, the female part 81 can be a magnet or both the male and female parts can be magnets with opposite poles thereof facing each other.

Figure 11:
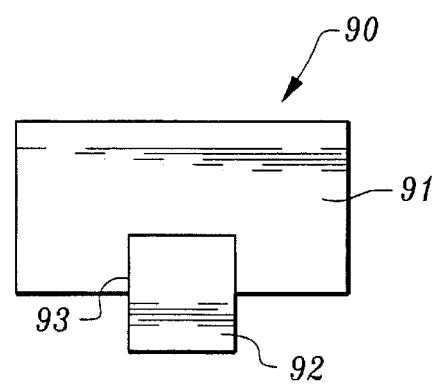
FIG. 11 shows a magnetic clip in accordance with another embodiment of the invention.

FIG. 11 shows an embodiment of a magnetic clip 90 in accordance with the invention wherein the magnetic clip 90 includes a female part 91 and a male part 92, at least one of which is a magnet. The male part is a cylindrical rod and the free end thereof forms a projection which is received in a recess 93 of the female part 91. As an example, the male part 92 can be a magnet and the female part 91 can be of a magnetizable material such as iron or steel. Alternatively, the female part 91 can be a magnet or both the male and female parts can be magnets with opposite poles thereof facing each other.

Figure 12:
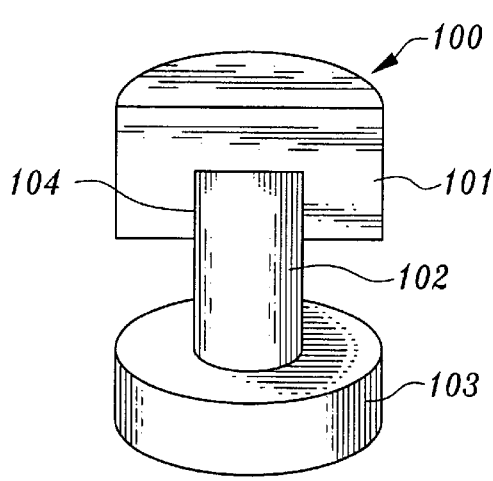
FIG. 12 shows a magnetic clip in accordance with a further embodiment of the invention.

FIG. 12 shows an embodiment of a magnetic clip 100 in accordance with the invention wherein the magnetic clip 100 includes a female part 101 and a male part 102, at least one of which is a magnet. The male part 102 etends from a base 103 which can be of a conductive, non-conductive or semi-conductive material. The male part 102 is a cylindrical rod and the free end of the rod forms a projection which is received in a recess 104 in the female part 101. As an example, the male part 102 can be a magnet and the female part 101 can be of a magnetizable material such as iron or steel. Alternatively, the female part 101 can be a magnet or both the male and female parts can be magnets with opposite poles thereof facing each other.

Figure 13:
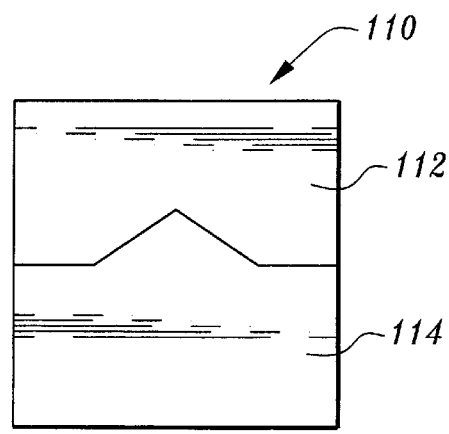
FIG. 13 shows a magnetic clip in accordance with an embodiment of the invention.

FIG. 13 shows an example of a magnetic clip 110 having a female part 112 and a male part 114 wherein the female part 112 includes a conical recess which receives a conical projection on the male part 114. The male part 114 can be a magnet and the female part 112 can be of a magnetizable material such as iron or steel. Alternatively, the female part 112 can be a magnet or both the male and female parts can be magnets with opposite poles thereof facing each other.

According to the various embodiments of the invention, two pieces of magnetic or magnetizable material can be mated using various designs such as a "dovetail" type design. For example, the male piece can be guided into the female piece by the V grooves and form a secure bond holding in two directions, including the downward resistance as well as side-to-side shifting. This positive attachment feature overcomes many of the problems of prior art frames. The magnets can be aligned in either the horizontal or vertical planes. In the vertical system, it could be behind the end pieces, or above, below, or even inside the existing end piece of the primary frame. In the horizontal position it could be above or below as well.

A further enhancement of this would be to have the auxiliary eyeglasses slightly sprung closed such that, upon attachment, there would be a further mechanical force sliding the male portion into the female which would augment the magnetic support.

Advantages of this invention include the following features: positive positioning through the use of alignment sections; stronger bonding with the addition of mechanical closing forces; ability to cosmetically disguise the magnets behind the end piece; and/or provide increased structural attachment for both vertical and horizontal motion while providing an easily attachable and detachable mechanism.

The foregoing has described the principles, preferred embodiments and modes of operation of the present invention. However, the invention should not be construed as being limited to the particular embodiments discussed. Thus, the above-described embodiments should be regarded as illustrative rather than restrictive, and it should be appreciated that variations may be made in those embodiments by workers skilled in the art without departing from the scope of the present invention as defined by the following claims.

What is claimed is:

1. A magnetic mounting arrangement for removably attaching auxiliary eyeglasses to an eyeglass frame, comprising:

a male part having a projection thereon and a female part having a recess therein, the male part including a stepped surface and the female part including a stepped surface, the male and female parts being attached to the auxiliary eyeglasses and the eyeglass frame such that the auxiliary eyeglasses are magnetically attached to the eyeglass frame by engaging the projection of the male part in the recess of the females part with said stepped surfaces of the male and female parts being in contact.

2. The magnetic mounting arrangement of claim 1, wherein the male part is attached to an extension on the eyeglass frame or to an extension on the auxiliary eyeglasses.

3. The magnetic mounting arrangement of claim 1, wherein the male part includes a flat surface adjacent the projection and the female part includes a flat surface adjacent the recess, the flat surface of the male part abutting the flat surface of the female part when the auxiliary eyeglasses are attached to the eyeglass frame by the magnetic mounting arrangement.

4. The magnetic mounting arrangement of claim 1, wherein the magnetic mounting arrangement prevents lateral movement of the auxiliary eyeglasses with respect to the eyeglass frame.

5. The magnetic mounting arrangement of claim 1, wherein the magnetic mounting arrangement includes a first pair of the male and female parts and a second pair of the male and female parts, the first pair of male and female parts being attached to left-side extensions of the eyeglass frame and auxiliary eyeglasses and the second pair of male and female parts being attached to right-side extensions of the eyeglass frame and auxiliary eyeglasses.

6. The magnetic mounting arrangement of claim 1, wherein the male and female parts are attached to a nose bridge of the eyeglass frame and a bridge of the auxiliary eyeglasses.

7. The magnetic mounting arrangement of claim 1, wherein the male and female parts are permanent magnets.

8. The magnetic mounting arrangement of claim 1, wherein either the male part or the female part is of a magnetizable material.

9. The magnetic mounting arrangement of claim 1, wherein the auxiliary eyeglasses include a bridge of elastic material, the bridge being elastically deformed and exerting a force on the male and female parts when the auxiliary eyeglasses are attached to the eyeglass frame.

10. The magnetic mounting arrangement of claim 9, wherein the bridge consists essentially of beta-titanium.

11. The magnetic mounting arrangement of claim 1, wherein the male and female parts are not visible when the auxiliary eyeglasses are attached to the eyeglass frame.

12. The magnetic mounting arrangement of claim 1, wherein the auxiliary eyeglasses are sunglasses.

13. The magnetic mounting arrangement of claim 1, wherein the male part includes a magnet forming part of the projection and a non-magnetic material forming at least part of the male part.

14. The magnetic mounting arrangement of claim 1, wherein the female part includes a magnet defining part of the recess and a non-magnetic material forming at least part of the female part.

15. The magnetic mounting arrangement of claim 1, wherein the projection comprises a magnet and the female part comprises a magnetizable steel.

16. The magnetic mounting arrangement of claim 1, wherein the female part includes a magnetizable steel defining at least part of the recess.

17. A magnetic mounting arrangement for removably attaching auxiliary eyeglasses to an eyeglass frame, comprising:

a male part having a projection thereon and a female part having a recess therein, the male part including a stepped surface and the female part including a stepped surface, the male and female parts being attached to the auxiliary eyeglasses and the eyeglass frame such that the auxiliary eyeglasses are magnetically attached to the eyeglass frame by engaging the projection of the male part in the recess of the female part with said stepped surfaces of the male and female parts being in contact, the magnetic mounting arrangement preventing lateral movement of the auxiliary eyeglasses with respect to the eyeglass frame, the male and female parts being of a magnetic or magnetized material, and the male and female parts being concealed from view when the auxiliary eyeglasses are attached to the eyeglass frame.

* * * * *